Dec. 16, 1947.  P. ARVIDSON  2,432,852
HAY UNLOADER WITH EXTENDED SIDE WALL BASE
AND RECIPROCABLE BOTTOM FORMING MEMBER
Filed Jan. 30, 1943

INVENTOR.
PAUL ARVIDSON
BY A. E. Fisher

ATTORNEY

Patented Dec. 16, 1947

2,432,852

UNITED STATES PATENT OFFICE 2,432,852

HAY UNLOADER WITH EXTENDED SIDE WALL BASE AND RECIPROCABLE BOTTOM FORMING MEMBER

Paul Arvidson, Needles, Calif.

Application January 30, 1943, Serial No. 474,219

2 Claims. (Cl. 222—199)

This invention relates to vehicular hay distributors or spreaders, and the prime object of the invention is to provide an apparatus for mounting upon a wagon or truck in lieu of the usual hay rack, and whereby cured hay may be conveniently spread or distributed out over a stock range for the feeding of cattle, horses or other stock.

Another object is to provide, in an apparatus of the kind described, an elongated, laterally inclosed receptacle or hay box, open at top and having a feed opening out through the rear end near the bottom of the box, a feed or hay carrier reciprocably mounted on the bottom of the box and formed with a plurality of elongated, transverse feed bars mounted on its upper side, said bars being acute-angled in cross-section, with their upstanding apices turned rearwardly towards said feed opening, with means for reciprocating the feed carrier for feeding the hay little by little rearwardly and out through the opening, as the vehicle is moved along over the field or range.

With the stated objects in view, attention is directed to the drawing wherein.

Figure 1:
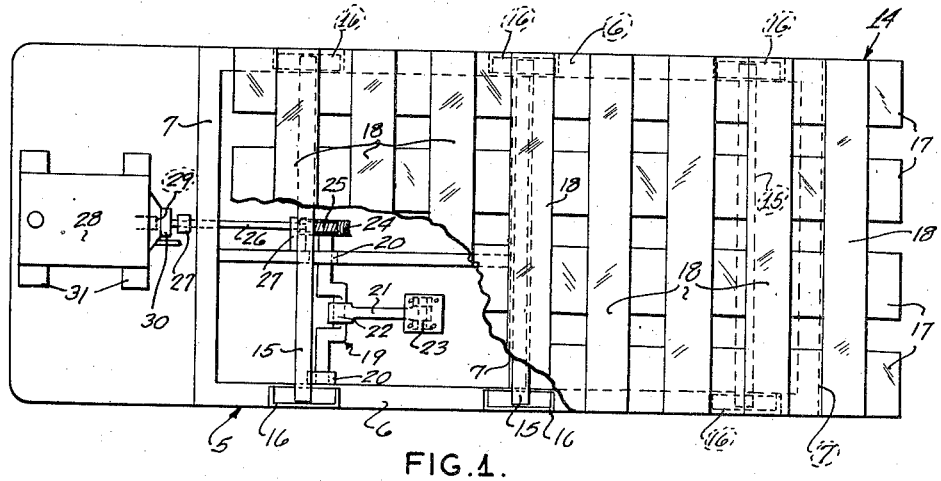
Figure 1 is a plan view of the assembly constituting the invention, a frontal floor section being broken out to show the mounting of the driving elements.

The apparatus is designed for mounting upon any suitable wagon or truck chassis (not shown), in lieu of the conventional hay rack, and comprises a base frame 5 of conventional structure and including side sills 6 properly spaced apart side by side and rigidly joined by cross sills 7. The base frame 5 so constructed is inclosed laterally by side boards 8 and at the ends by end boards or closures 9, all of the required and equal height for holding a substantial amount of hay. The rear end board or closure, however, is raised at its lower margin and is spaced from the base frame 5, so as to provide a feed opening or port 10 at this rear end. Apron boards 11 are anchored at their outer margins to the upper margins of the end boards 9, as indicated at 12, and are extended slopingly inward and downward towards the base frame 5, thus leaving an intervening opening 13 through which hay may fall.

Figure 2:
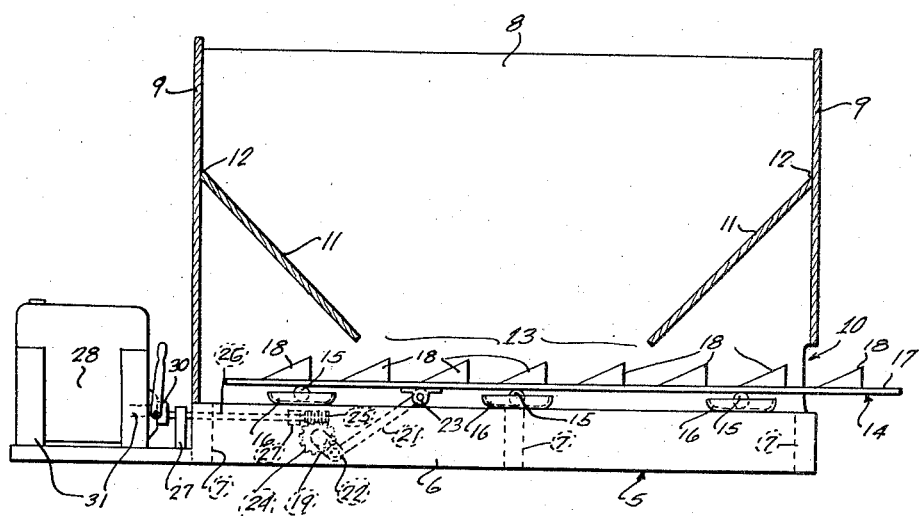
Figure 2 is a longitudinal vertical section.

A reciprocable feed or hay carrier 14 is freely laid upon rollers 15 extended transversely in spaced relation from end to end of the base frame, with their ends bearing on the side sills 6, where they are confined in run-ways 16 permitting a limited reciprocable movement to said rollers and carrier. The rear end of the carrier projects out through the opening 10, as shown. Thus the carrier 14 is reciprocably positioned immediately below the medial opening 13 as formed by the downwardly and inwardly converged aprons 11, and it is to be noted that these aprons are sufficiently raised above the carrier to provide clearance spaces below the aprons. Also it is to be noted that the downward and inward sloping of the aprons 11 provide angular chambers between the aprons and the ends 9 of the structure, as clearly shown in Figure 2 of the drawing. The frontal clearance space or chamber thus provided serves to accommodate the forward end of the reciprocating carrier 14 and protects this end of the carrier from clogging up with hay. On the other hand the rear chamber or clearance space provides room for the hay in passing out rearwardly over the carrier to accumulate therein to some extent for mixing and thence to pass out through the feed port 10 onto the protruded outer end of the carrier, whence it is scattered endwise and laterally over the ground for the use of the stock.

The carrier 14 is formed of a plurality of boards 17 arranged side by side in spaced relation as shown, and these boards are anchored together to move as a unit by means of a plurality of feed bars 18 arranged transversely on the upper sides of the boards 17 and securely nailed or otherwise fastened thereto. The bars 18 are mounted in spaced relation from end to end of the boards 17, and are formed acutely angular in cross-section as shown, with their upstanding apices directed rearwardly towards the feed opening 10. Thus it is evident that with hay falling upon the carrier 14, and the latter in reciprocating motion, the hay will be gradually pushed and fed back by the bars 18, and forced out through the opening 10. A further advantage of the inwardly and downwardly sloping rear apron 11, is that as the hay passes rearwardly thereunder the sloping lower end of this apron catches a portion of the hay and rolls it back inwardly up the apron while the balance of the hay passes under the apron and out through the feed port 10. Thus the hay becomes thoroughly broken up and mixed as it is worked out through the feed port.

Reciprocal motion is imparted to the carrier 14 by means of a crank shaft 19 journaled at its ends in the base frame 5, as indicated at 20 and beneath the carrier 14. A crank arm 21 has one end engaging by a loop 22 of said crank shaft, and the other end is hinged at 23 to the under side of the carrier 14. A worm gear 24 is rigidly mounted on the inner end of the crank shaft 19, and the worm 25 of a worm-shaft 26 is placed in mesh with the gear 24, the said worm shaft being journaled at its ends in bearings 27 supported from the base frame 5 below the carrier.

The worm-shaft 26 is driven by an engine or motor 28, to the shaft 29 of which the worm shaft is operatively and releasably associated through a conventional clutch mechanism 30. The engine is supported in a hod 31 mounted at the front of the base frame.

In use the apparatus is mounted on any suitable truck or truck or wagon chassis, as above stated, for travel over the field or range wherein the stock to be fed are located. Hay is then loaded onto and into the top of the apparatus, where it falls upon the aprons 11 and thence down upon the feed carrier 14. The engine then being energized, and the clutch let in, the worm-shaft in turn operates the crank-shaft and reciprocates the carrier, thus feeding the hay out slowly through the feed port as stated, and distributing same evenly over the field for the stock, as the vehicle moves along.

The apparatus thus relieves the operator of the duty of forking out hay, while at the same time driving his vehicle.

Figure 3:
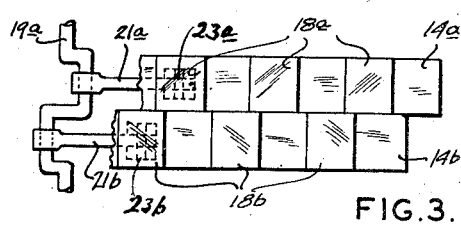
Figure 3 is a detail view in reduced plan, showing a slightly modified form of the invention.

In Figure 3 is shown a slightly modified form of the invention, wherein the hay carrier 14 of the previously described structure instead of being made unitary, the said carrier is made in two longitudinally divided parts 14a, 14b, each carrying its separate feed bars 18a, 18b, and the crank shaft 19 of the previous structure designated as 19a in this figure being formed with two oppositely turned cranks as shown, with crank arms 21a, 21b hinged at 23a, 23b to the two parts or sections 14a, 14b. This arrangement imparts opposite reciprocable movement to the sections 14a, 14b. Otherwise the operation of the apparatus is the same as already described.

While I have here shown and described a specific apparatus for the purpose described, the structural features thereof may be changed or modified, within the scope of the claims.

I claim:

1. In an apparatus of the kind described including a base frame with spaced side sills and transverse end sills at the ends of the side sills, and including a hay carrier reciprocally mounted upon the base frame for longitudinal movement thereon, means for reciprocating the hay carrier, same comprising a crank shaft journaled forwardly across the frame underneath the hay carrier, a crank arm journaled at its outer end onto the crank of the crank shaft, and hinged at its inner end to the under side of the carrier, a worm gear on the crank shaft and a worm shaft journaled in the frame below the hay carrier perpendicularly to the crank shaft and in operative alignment with the worm gear of the crank shaft and with the worm in mesh with said worm gear, and means for rotating the worm shaft for reciprocating the hay carrier.

2. In an apparatus of the kind described and wherein is embodied a base frame and side and end closures erected upon the frame, the rear end closure being raised to provide a feed port thereat, and including a hay or feed carrier reciprocably mounted upon the base frame within the side and end closures thereof and arranged to feed hay or the like out rearwardly through said feed port, a pair of downwardly and inwardly inclined aprons supported at their upper margins from the upper margins of the end closures of the structure, with a central clearance between their lower and inner ends, the said aprons thus serving both to direct the hay centrally to the said carrier and to provide chambers at the ends of the structure for facilitating the working of the apparatus.

PAUL ARVIDSON.

REFERENCES CITED

The following references are of record in the file of this patent:

UNITED STATES PATENTS

| Number | Name | Date |
|---|---|---|
| 21,780 | Simmons | Oct. 12, 1858 |
| 146,251 | Hardwick | Jan. 6, 1874 |
| 327,011 | Norton, Sr. | Sept. 29, 1885 |
| 330,880 | Faulkner | Nov. 24, 1885 |
| 615,748 | Richner | Dec. 13, 1898 |
| 1,013,546 | Gibeau et al. | Jan. 2, 1912 |
| 1,880,287 | Sifton | Oct. 4, 1932 |
| 2,278,730 | Neuman | Apr. 7, 1942 |

FOREIGN PATENTS

| Number | Country | Date |
|---|---|---|
| 17,234 | Austria | Apr. 20, 1934 |
| 518,566 | Germany | Feb. 18, 1931 |